US011620862B1

(12) United States Patent
Serrao et al.

(10) Patent No.: US 11,620,862 B1
(45) Date of Patent: Apr. 4, 2023

(54) METHOD AND SYSTEM FOR RECONSTRUCTING INFORMATION ABOUT AN ACCIDENT

(71) Applicant: UIPCO, LLC, San Antonio, TX (US)

(72) Inventors: Nolan Serrao, Plano, TX (US); Ruthie D. Lyle, Durham, NC (US); Bharat Prasad, San Antonio, TX (US); Ravi Durairaj, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 44 days.

(21) Appl. No.: 16/928,137

(22) Filed: Jul. 14, 2020

Related U.S. Application Data

(60) Provisional application No. 62/874,041, filed on Jul. 15, 2019.

(51) Int. Cl.
*G07C 5/08* (2006.01)
*G06T 17/00* (2006.01)
*G06T 13/80* (2011.01)
*G06Q 40/08* (2012.01)

(52) U.S. Cl.
CPC .............. *G07C 5/08* (2013.01); *G06Q 40/08* (2013.01); *G06T 13/80* (2013.01); *G06T 17/00* (2013.01)

(58) Field of Classification Search
None
See application file for complete search history.

(56) References Cited

U.S. PATENT DOCUMENTS

| | | | | |
|---|---|---|---|---|
| 9,691,189 B1* | 6/2017 | Creath | ............... | G06Q 10/06 |
| 9,783,159 B1* | 10/2017 | Potter | ............... | G08B 21/02 |
| 10,853,882 B1* | 12/2020 | Leise | ............... | G06V 20/46 |
| 11,010,643 B1* | 5/2021 | Campbell | ............ | G06K 9/6263 |
| 11,308,741 B1* | 4/2022 | Cardona | ............... | G10L 15/26 |
| 2006/0229784 A1* | 10/2006 | Bachmann | ........ | B60R 21/01512 |
| | | | | 701/45 |
| 2008/0052134 A1* | 2/2008 | Nowak | ............... | G06Q 40/08 |
| | | | | 705/4 |
| 2008/0098993 A1* | 5/2008 | Hoffman | ............... | F02M 37/08 |
| | | | | 123/446 |
| 2010/0042952 A1* | 2/2010 | Geesey | ............... | G06Q 50/30 |
| | | | | 715/851 |
| 2013/0086109 A1* | 4/2013 | Huang | ............... | G06F 16/244 |
| | | | | 707/770 |
| 2015/0112800 A1* | 4/2015 | Binion | ............... | G06Q 30/0255 |
| | | | | 705/14.53 |
| 2016/0323718 A1* | 11/2016 | Dawson | ............... | G09B 19/14 |
| 2017/0069144 A1* | 3/2017 | Lawrie-Fussey | ...... | G06Q 10/20 |
| 2018/0061151 A1* | 3/2018 | Chainer | ............... | H04W 4/90 |
| 2018/0162393 A1* | 6/2018 | Lee | ............... | B60W 30/0956 |
| 2020/0042657 A1* | 2/2020 | Todd | ............... | G06F 30/15 |
| 2020/0098206 A1* | 3/2020 | Dugas | ............... | G07C 5/008 |

(Continued)

Primary Examiner — Jeffrey J Chow
(74) Attorney, Agent, or Firm — Plumsea Law Group, LLC

(57) ABSTRACT

A system and method for reconstructing information about vehicular accidents is disclosed. The system comprises an onboard computing system in a vehicle with an accident reconstruction system. Using sensed information from vehicle sensors and an animation engine, the system can generate animated videos depicting the accident. The system can also take action in response to information it learns from the animated video and/or an underlying 3D model of the accident used to generate the video.

14 Claims, 10 Drawing Sheets

(56) References Cited

U.S. PATENT DOCUMENTS

| | | | |
|---|---|---|---|
| 2020/0226853 A1* | 7/2020 | Ahmed | H04L 9/0618 |
| 2021/0004909 A1* | 1/2021 | Farmer | H04W 4/029 |
| 2021/0295441 A1* | 9/2021 | Mullen | G08G 1/04 |
| 2022/0044024 A1* | 2/2022 | Sambo | G06T 7/20 |

* cited by examiner

US 11,620,862 B1

METHOD AND SYSTEM FOR RECONSTRUCTING INFORMATION ABOUT AN ACCIDENT

CROSS-REFERENCE TO RELATED APPLICATIONS

This application claims the benefit of Provisional Patent Application No. 62/874,041 filed Jul. 15, 2019, and titled "Method and System for Reconstructing Information About an Accident," which is incorporated by reference herein in its entirety.

TECHNICAL FIELD

The present disclosure generally relates to systems for monitoring vehicles, and in particular to systems for monitoring vehicles during an accident.

BACKGROUND

Following an accident, a driver may or may not call their insurance carrier to provide details about the accident. If an accident is reported, it is a very time consuming process. In addition, the driver may forget or misremember details about the accident. The driver may also be in a physical or mental state that prevents them from providing accurate details about incidents before, during or after the accident. The representative of the insurance carrier may therefore obtain an inaccurate understanding of how the accident occurred and what damage has occurred to the vehicle. This inaccuracy can lead to delays in claim processing, inaccurate damage estimates, multiple inspections, as well as additional costs to both the insurance provider and the driver in some cases.

There is a need in the art for a system and method that addresses the shortcomings discussed above.

SUMMARY

In one aspect, a method of generating an animation for a vehicle accident includes monitoring a set of vehicle sensors, the set of vehicle sensors including at least one camera. The method also includes, detecting that an accident has occurred, retrieving a set of accident data from the set of vehicle sensors, generating an animated video of the accident using the set of accident data, and presenting the animated video of the accident to a user.

In another aspect, a method of controlling a vehicle system in response to information from a 3D model of an accident includes monitoring a set of vehicle sensors, detecting that an accident has occurred, retrieving a set of accident data from the set of vehicle sensors, generating a 3D model of the accident using the set of accident data, assessing damage to a vehicle system of the vehicle based on the 3D model, modifying the control of a vehicle system to mitigate further damage to the vehicle.

In another aspect, a system for reconstructing information about an accident involving a vehicle includes an onboard computing system in the vehicle. The onboard computing system includes a set of sensors and an accident reconstruction system including a first animation engine. The accident reconstruction system is further configured to monitor information from the set of sensors, detect an accident, retrieve a set of accident data, and generate an animated video of the accident using the set of accident data and the first animation engine. The system also includes a second computing system in communication with the onboard computing system in the vehicle. The second computing system includes a second animation engine that is substantially similar to the first animation and model engine. The second computing system is further configured to receive the accident data and generate the animated video of the accident using the set of accident data and the second animation engine.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF THE EMBODIMENTS

The embodiments provide a system and method for generating an animated video and/or three-dimensional model (i.e., "3D model") of an accident involving one or more vehicles. The animated video and/or 3D model can be constructed from data retrieved from multiple vehicle sensors. The animated video can be further enhanced, if there is availability from sensed information provided by other vehicles in the vicinity, from information gathered by roadway sensors, and/or information retrieved from other services (such as a traffic or weather service). The system includes an animation and model engine that can be used to build an animated video and/or associated 3D model that simulates the accident. The animated video can then be viewed by other parties, such as an insurance agent, for the purposes of gathering details about an accident. Thus, the system is able to capture a great deal of information from an accident and build a robust animation or 3D model that can be easily understood by the driver as well as other parties.

In the immediate aftermath of the accident, the animated video and/or model can also be used to assess the severity of the accident. The video and/or model can also be used to determine if there is any risk of further damage to occupants, or to any parts of the vehicle. To mitigate any further risk, the system may modify the control of one or more vehicle systems.

Figure 1:
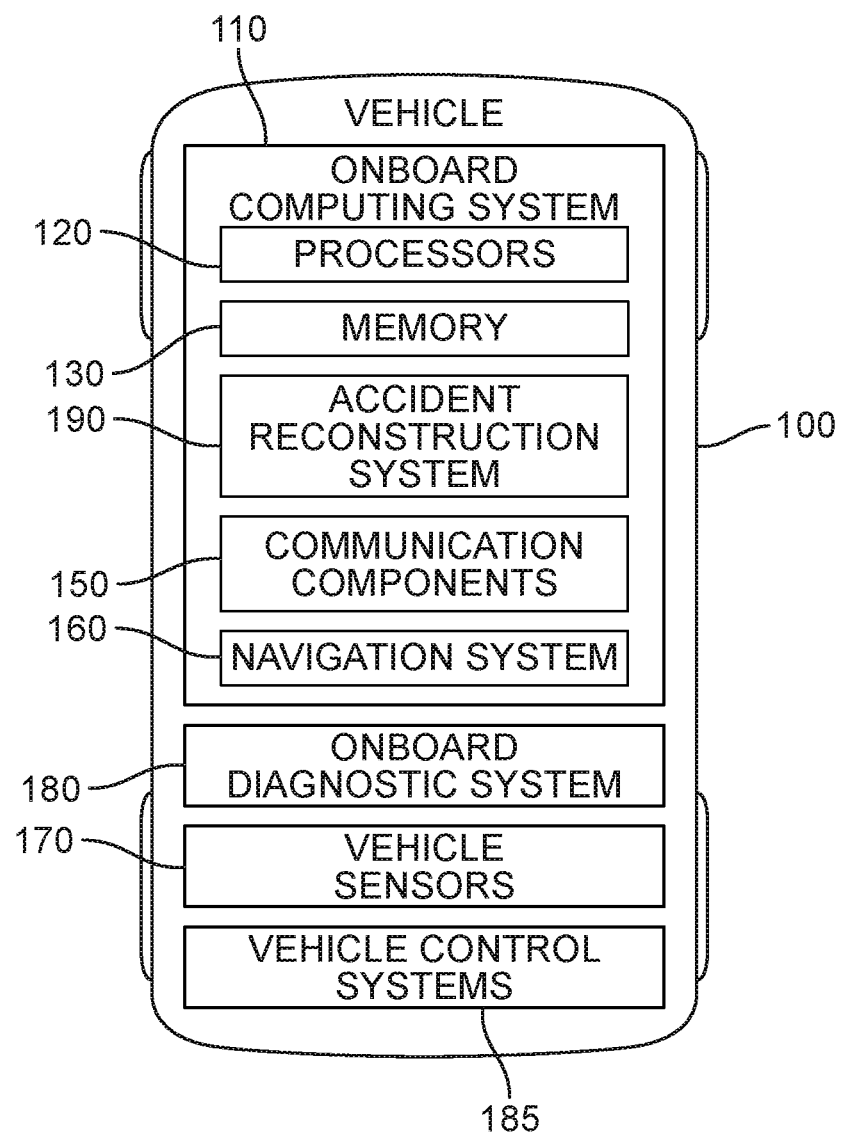
FIG. 1 is a schematic view of a motor vehicle, according to an embodiment.

FIG. 1 is a schematic view of a motor vehicle 100, or simply vehicle 100. Vehicle 100 may include an onboard computing system 110, also referred to simply as system 110. Onboard computing system 110 may comprise a single computing device, or a network of multiple computing devices. Onboard computing system 110 could be associated with one or more electronic control units (ECUs). As seen in FIG. 1, onboard computing system 110 includes one or more processors 120 and memory 130. Memory 130 may comprise a non-transitory computer readable medium. Instructions stored within memory 130 may be executed by the one or more processors 120.

For clarity, some of the vehicle systems of the embodiments are depicted as residing within a single onboard computing system 110. However, it may be appreciated that in some embodiments, one or more of these systems could be separate and may not comprise part of a single computing system. Instead, two or more systems could each comprise their own processors and/or memory, as well as components facilitating communication with other systems.

Vehicle 100 may also include one or more communication components 150. Communication components 150 may include cellular network components for communicating over cellular networks, Wi-Fi components for communicating over Wi-Fi networks, components for communicating over personal area networks (for example, using the Bluetooth protocol), Near Field Communication (NFC) components, and any other suitable communication components.

Vehicle 100 may also include a navigation system 160. In some cases, navigation system 160 includes a GPS receiver that can receive GPS information. In other cases, navigation system 160 can include other receivers capable of receiving global or local positioning information. Additionally, navigation system 160 may comprise maps and/or information from other kinds of geographic information systems (GIS) that can be used to generate navigation routes for a driver.

Figure 2:
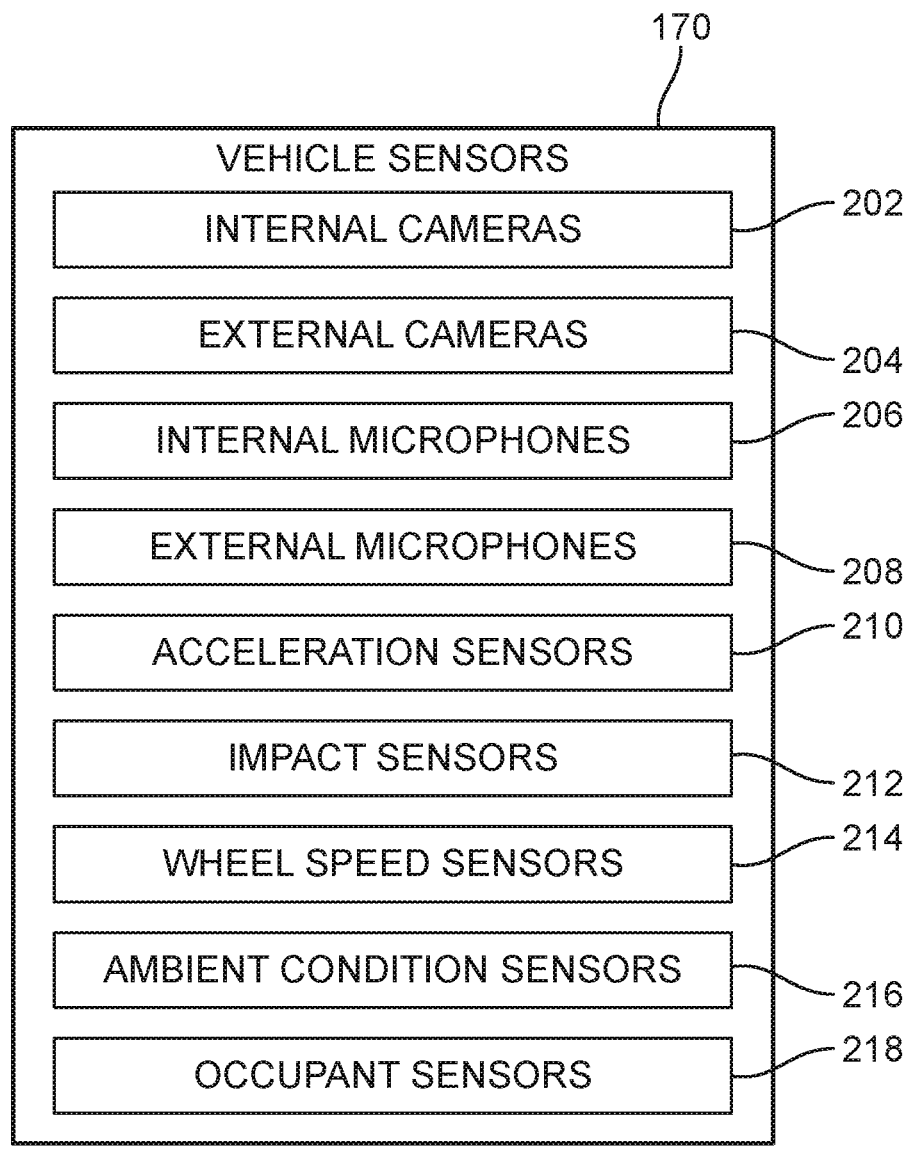
FIG. 2 is a schematic view of multiple vehicle sensors, according to an embodiment.

Vehicle 100 may also include one or more vehicle sensors 170. Some exemplary sensors are shown in FIG. 2. These include internal cameras 202 and external cameras 204 that can capture still images and/or video of the interior, exterior, and/or surrounding environment of vehicle 100. Sensors 170 can also include internal microphones 206 and external microphones 208 for capturing audio information inside or outside of vehicle 100. Vehicle sensors 170 may also include acceleration sensors 210 and wheel speed sensors 214 that can be used to determine the acceleration and/or velocity of vehicle 100. Impact sensors 212 may also be used to detect impacts at one or more locations on a vehicle. Additionally, vehicle sensors 170 may include ambient condition sensors 216, which may include temperature sensors, pressure sensors, wind sensors, humidity sensors and/or other suitable sensors. Additionally, vehicle sensor 170 could include one or more occupant sensors 218 that can detect which seats are occupied and/or the type of occupant (for example, a child or an adult). Still further sensors that could be used include, but are not limited to: steering angle sensors, brake pedal sensors, acceleration pedal sensors, light detection and ranging (LIDAR) sensors, and/or RADAR based sensors.

Referring back to FIG. 1, vehicle 100 may also include an onboard diagnostics (OBD) system 180. An OBD system may track and process various vehicle sensor information. In some cases, one or more systems of vehicle 100 could retrieve sensory data from the OBD system rather than directly from the sensors themselves. In some embodiments, onboard diagnostics system 180 could be used with a telematics device that receives information from the OBD to track and store various kinds of data in an ongoing manner. In such cases, other systems, such as the accident reconstruction system described below, can communicate with a telematics device.

Vehicle 100 may include a plurality of vehicle control systems 185. As used herein, the term "vehicle control system" refers to any system capable of controlling components, devices, and/or other systems of a vehicle. Exemplary vehicle control systems include, but are not limited to: engine control systems (including fuel injection systems), climate control systems, power window systems, and electronic braking control systems.

Vehicle 100 may also include an accident reconstruction system 190, also referred to simply as system 190. Accident reconstruction system 190 includes provisions for receiving sensory information, detecting an accident, and processing that information to build 3D models and/or animated videos of an accident (such as a collision). Accident reconstruction system 190 may also include provisions for modifying the operation of one or more vehicle control systems based on sensory information, 3D models and/or animated videos.

Figure 3:
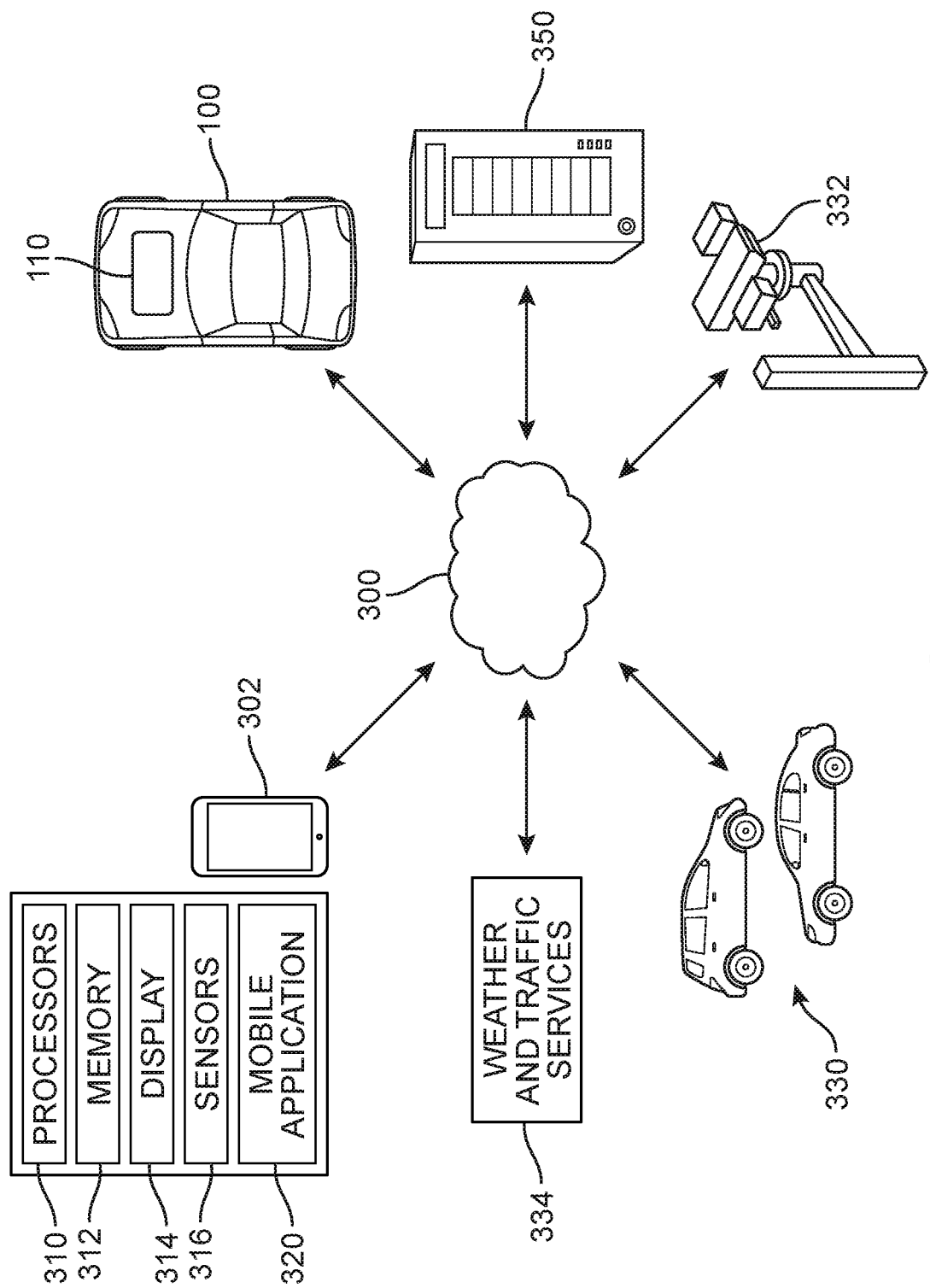
FIG. 3 is a schematic view of a vehicle in communication with various other systems over one or more networks, according to an embodiment.

FIG. 3 is a schematic view of various systems that may communicate with onboard computing system 110 of vehicle 100 over one or more networks 300. These include a mobile device 302. Mobile device 302 could be a mobile phone, tablet or other computing device. In the example of FIG. 3, mobile device 302 includes processors 310, memory 312, and a display 314. Mobile device 302 may include one or more sensors 316, such as accelerometers, cameras, microphones and a GPS receiver. Mobile device 302 may also include software in the form of a mobile application 320. As discussed in further detail below, mobile application 320 can facilitate generating and/or displaying animated videos.

Vehicle 100 may receive sensed information from other vehicles 330. Such vehicles could be equipped with their own sensors whose data can be made available to onboard computing system 110. In some cases, vehicle 100 could receive information from roadway sensors 332. For example, vehicle 100 could receive images from a red-light camera. Vehicle 100 could also retrieve information from various third-party services, including weather and/or traffic services 334.

Onboard computing system 110 may communicate with a remote server 350. Remote server 350 may itself include provisions for receiving, processing, and storing data transmitted by onboard computing system 110. Specifically, remote server 350 may include one or more processors, memory (including possibly a database), and software for generating 3D models and/or animated videos.

For clarity, networks 300 are shown as a single network. However, onboard computing system 110 may communicate with different components over different networks. For example, system 110 may communicate with remote server 350 over a wide area network. By contrast, system 110 may communicate with mobile device 302 over a local area network and/or a personal area network. In some cases, system 110 may communicate with other vehicles 330 over vehicle-to-vehicle network (such as a dedicated short-range communication network).

Figure 4:
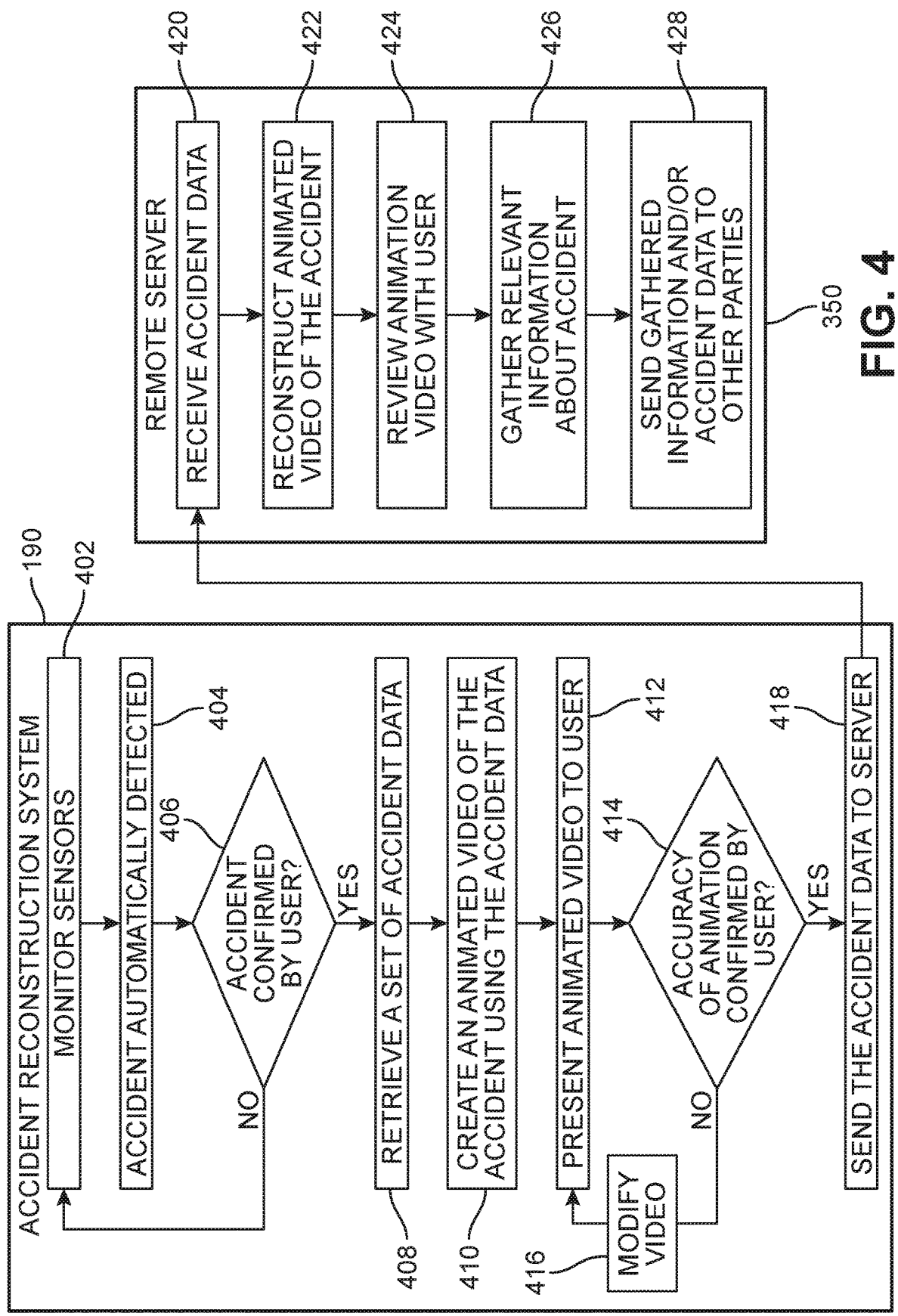
FIG. 4 is a schematic view of a process for generating an animated video of an accident, according to an embodiment.

FIG. 4 is a schematic view of a process where an accident reconstruction system collects sensory data following an accident (for example, a collision between two vehicles) and then processes the data to generate an animated video. The animated video can then be viewed by both the user who has experienced the accident as well as another person (or system) trying to gather information about the accident. In this exemplary process, step 402 through step 418 may be performed by accident reconstruction system 190, while step 420 through step 428 may be performed by a remote server and/or parties associated with the remote server. However, in other embodiments, any steps could be performed by any other suitable parties. For example, as discussed in further detail below, in another embodiment, steps of generating an animated video could be performed by a mobile device in communication with accident reconstruction system 190.

In a first step 402, system 190 may monitor one or more vehicle sensors. In some cases, in addition to monitoring onboard vehicle sensors, system 190 could monitor information from sensors on other vehicles, by way of a vehicle-to-vehicle network, and/or from roadway sensors. In step 404, system 190 automatically detects an accident. For example, system 190 could detect information from one or more impact sensors that are indicative of an accident. As another example, system 190 could detect information from a camera or microphone indicative of an accident. In one embodiment, accident reconstruction system 190 may include machine learning algorithms that can classify images and/or sounds to predict if and when an accident has occurred.

Next, in step 406, system 110 may check with the user to see if an accident has occurred. In some cases, this could include sending a pop-up message to an in-dash display of the vehicle and/or to the user's mobile device (see for example, FIG. 6). In other cases, this may include an audible prompt over the vehicle's speakers. When an audible prompt is used, the system may be capable of detecting an audible response.

If no accident has occurred, the system returns to step 402. Otherwise, the system proceeds to step 408 to retrieve a set of accident data. As used herein, the term "accident data" refers to data from any sensors, systems and/or other sources that may be useful in building a model and/or visual depiction of an accident. Accident data may include data from any of the various data sources (including sensors) described above and shown in FIGS. 2 and 3, for example. In some cases, an accident reconstruction system could retrieve data in a particular time frame around when an accident is believed to have occurred. For example, the system could retrieve images, videos, audio, vehicle speed, and vehicle acceleration for a timeframe corresponding to one minute before an accident. As previously mentioned, accident data may also include data from other vehicles, from roadway sensors, as well as from third party services like weather and/or traffic services.

Next, in step 410, accident reconstruction system 190 may generate an animated video of the accident using the accident data. This process is described in further detail below and shown in FIG. 5. In some cases, accident reconstruction system 190 may also generate a 3D model as part of, or in parallel with, generating the animated video. For example, in some embodiments a system first generates a dynamic 3D model of an accident, including the vehicles or other objects involved in the accident, and then uses that model as the basis for rendering an animated video to represent the sequence of events.

In step 412, system 110 may present the animated video to a user. The user in this context could be a driver of the vehicle or another occupant. The animated video could be displayed on a display of the vehicle, or could be sent to the user's mobile device for viewing. Alternatively, the user could include state and/or federal officials (for example, police officers), city smart monitoring systems, and/or representatives from an insurance company. Additionally, an indicator derived from the animation could be used to automatically alert healthcare providers (such as an ambulance) and other support services. Next, in step 414, system 110 may have the user confirm that the animated video is sufficiently accurate. If the user does not feel the animation is accurate, the system may modify the video in step 416 and then return to step 412 to present the modified video to the user. To improve the accuracy of the video, the system may also change the accident data used by the model by adding additional data sources and/or removing others. If the system is unable to generate a video that the user finds sufficiently accurate after some predetermined number of attempts, the system could stop generating videos and inform the user that an accurate video cannot be created for this accident.

In step 418, after the accuracy of the animated video is confirmed by the user, system 110 may send the accident data to remote server 350. That is, the accident reconstruction system may not send a video file to the remote server, but may instead send only the raw data that was used to generate the video file. Because the raw data may be sufficiently smaller in size than the generated video file, this step may substantially reduce the amount of data that must be transmitted over a network. This may be especially important if an accident occurs in an area with limited network availability. Of course, in other embodiments, a video could be sent over the network instead of the raw data (or along with the raw data).

Once the accident data is received at remote server 350 in step 420, remote server 350 may reconstruct the animated video of the accident in step 422. To accomplish this, remote server 350 may be configured with sufficiently similar algorithms that are used to generate animated videos from raw accident data. Next, in step 424, the animated video may be presented to a representative to facilitate review of the accident. Specifically, in some cases, the representative could be a representative of an insurance company that provides coverage for the vehicle. In some cases, upon receiving the animated video of the accident, the representative could call the user of vehicle 100 to review the accident and gather any relevant information in step 426. Finally, the animated video and/or underlying raw accident data could be sent to other parties in step 428. As one example, an animated video of a collision could be sent to a repair facility to provide a visual image of the type of damage expected for the vehicle prior to its arrival at the repair facility.

This process of reviewing a reconstructed video of an accident based on sensed data may provide increased accuracy for reporting accidents over alternative methods that rely on user's to manually recall events from memory. Moreover, once the user confirms that the video is sufficiently accurate, the video can serve as a more reliable store of accident information than the user's long-term memory.

Though the exemplary process shown in FIG. 4 includes steps of having a user manually review the animated video of an accident with a representative, in other embodiments the animated video could be automatically analyzed to retrieve relevant analytic data without the need for a manual review.

Figure 5:
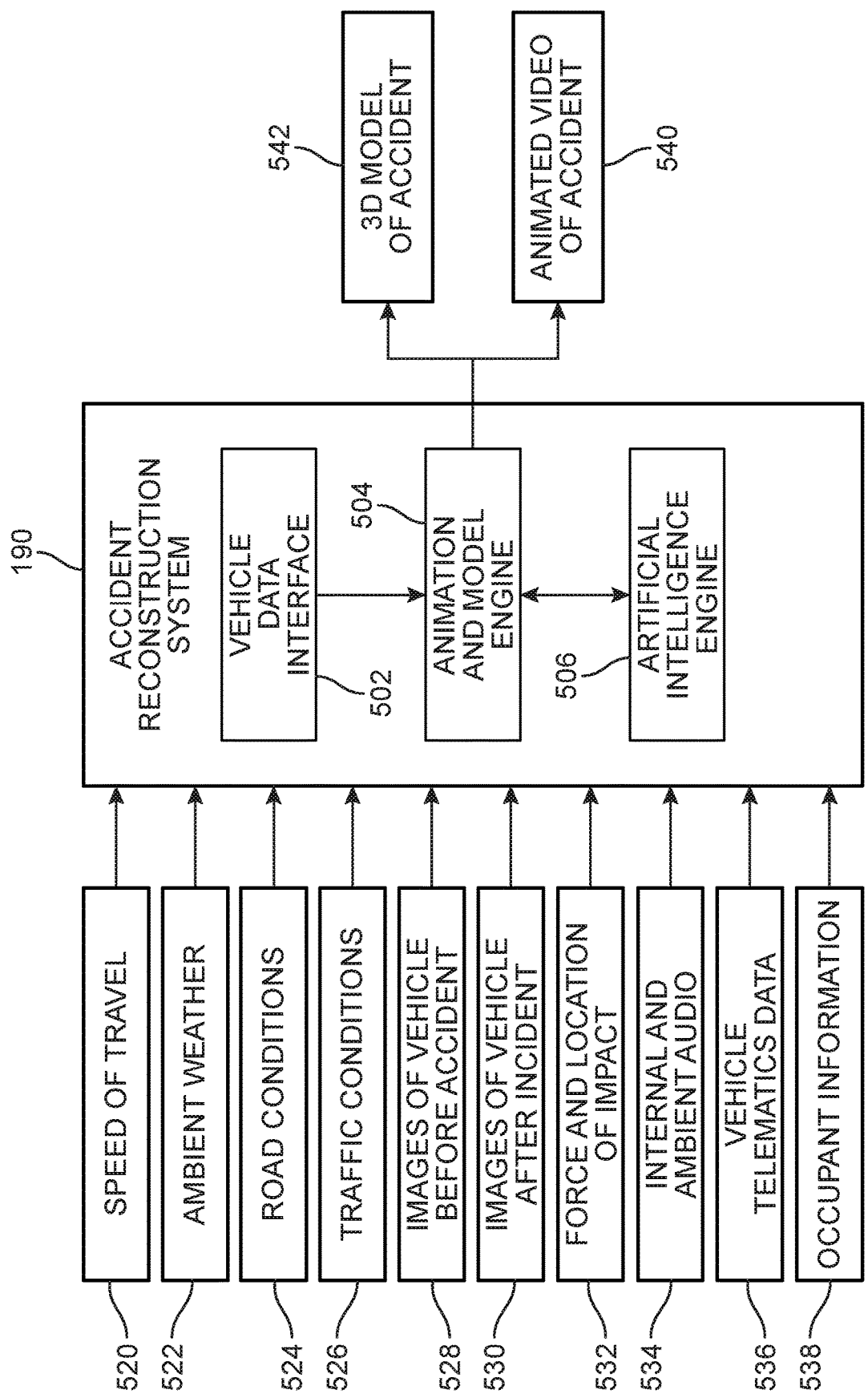
FIG. 5 is a schematic view of an embodiment of an accident reconstruction system.

FIG. 5 is a schematic view of accident reconstruction system 190, according to an embodiment. As seen in FIG. 5, system 190 includes a vehicle data interface 502, an animation and model engine 504, and an artificial intelligence engine 506. Interface 502 may include hardware and/or software based interfaces, such as application programming interfaces (APIs) that enable accident reconstruction system 190 to receive sensory information and/or other retrieved data (for example, data retrieved from third party databases). Examples of sensory information that can be received include, but are not limited to: speed of travel 520, ambient weather 522, road conditions 524, traffic conditions 526, images of the vehicle before the accident 528, images of the vehicle after the accident 530, force and location of impact 532, internal and ambient audio 534, telematics data 536, and/or occupant information 538. Of course, it may be appreciated that this is not an exhaustive list of the kinds of data that can be received, and that any other kinds of data provided by any of the sources described above may also be used as inputs.

Information collected at vehicle data interface 502 can be filtered (if needed) and fed into animation and model engine 504. Animation and model engine 504 comprises one or more algorithms that convert raw accident information into an animated video of an accident. Animation and model engine 504 may use any known methods in machine vision and/or machine learning more broadly in order to construct an animated video of the accident. In some cases, a separate artificial intelligence engine 506 may be used to facilitate transforming the raw data into an animated video. In other cases, artificial intelligence and/or machine learning modules could be integrated into animation and model engine 504.

As part of constructing an animated video, and/or in parallel, accident reconstruction system 190 may also build a 3D model of the accident. This model could be static or dynamic. As seen in FIG. 5, in some cases, animation and model engine 504 may output both an animated video of the accident 540 and a 3D model of the accident 542. Whereas the animated video may be especially useful for drivers, occupants and other parties to review the accident, the 3D model could be used by other software or systems to record information and/or take action in response to an accident, as discussed in further detail below. In some cases, a 3D model could be interactive, allowing the user to adjust parameters and/or move parts of the model to better understand the accident.

Figure 6:
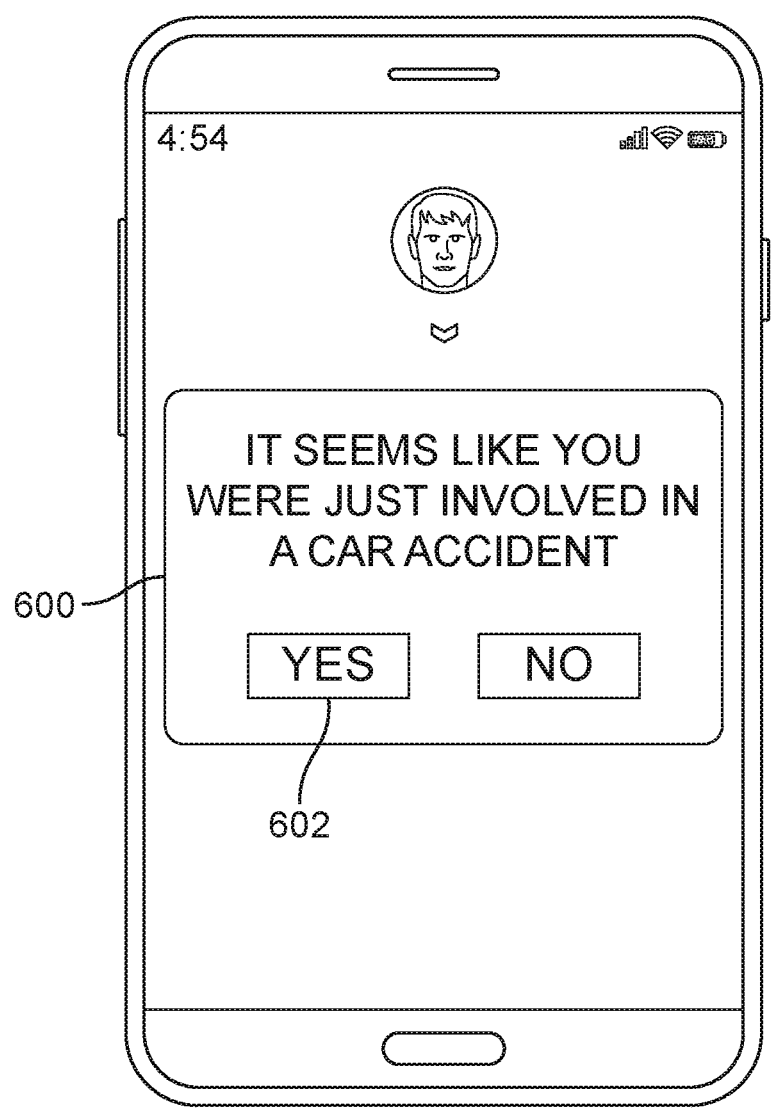
FIG. 6 is a schematic view of a prompt for a user regarding an accident, according to an embodiment.
Figure 8:
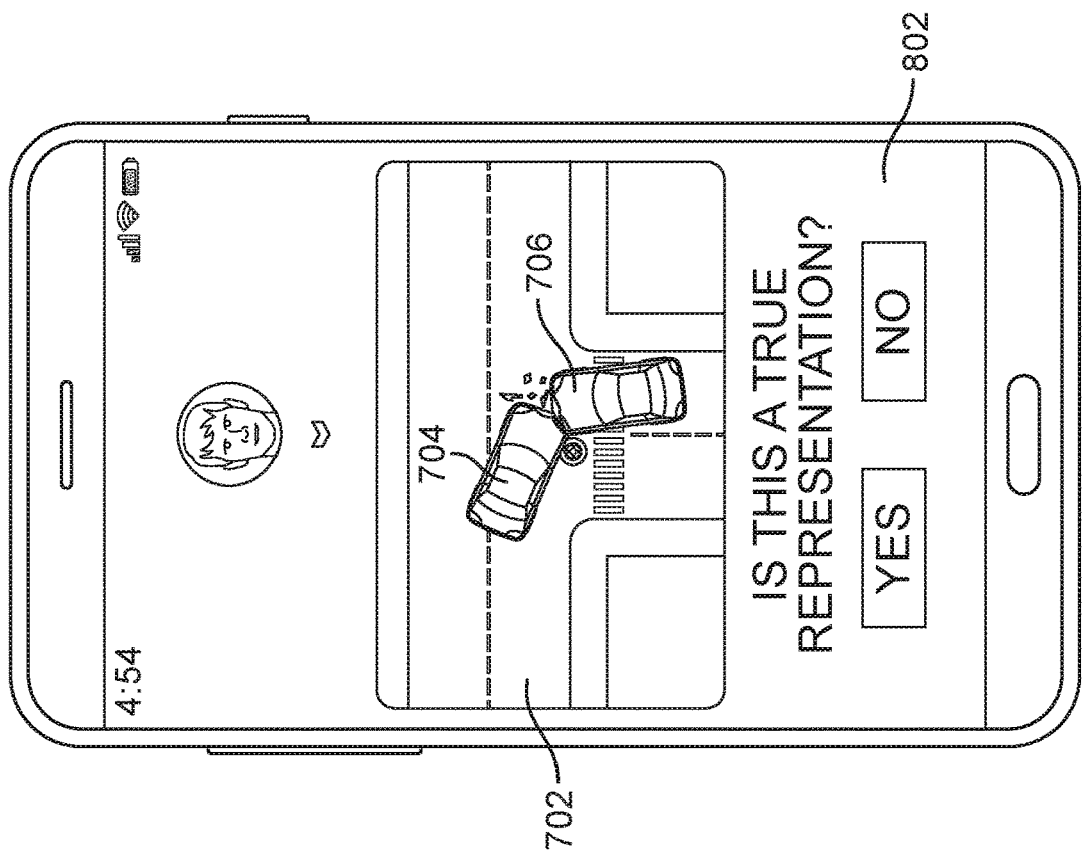
FIGS. 7-8 are schematic views of scenes from an animated video of an accident.
Figure 7:
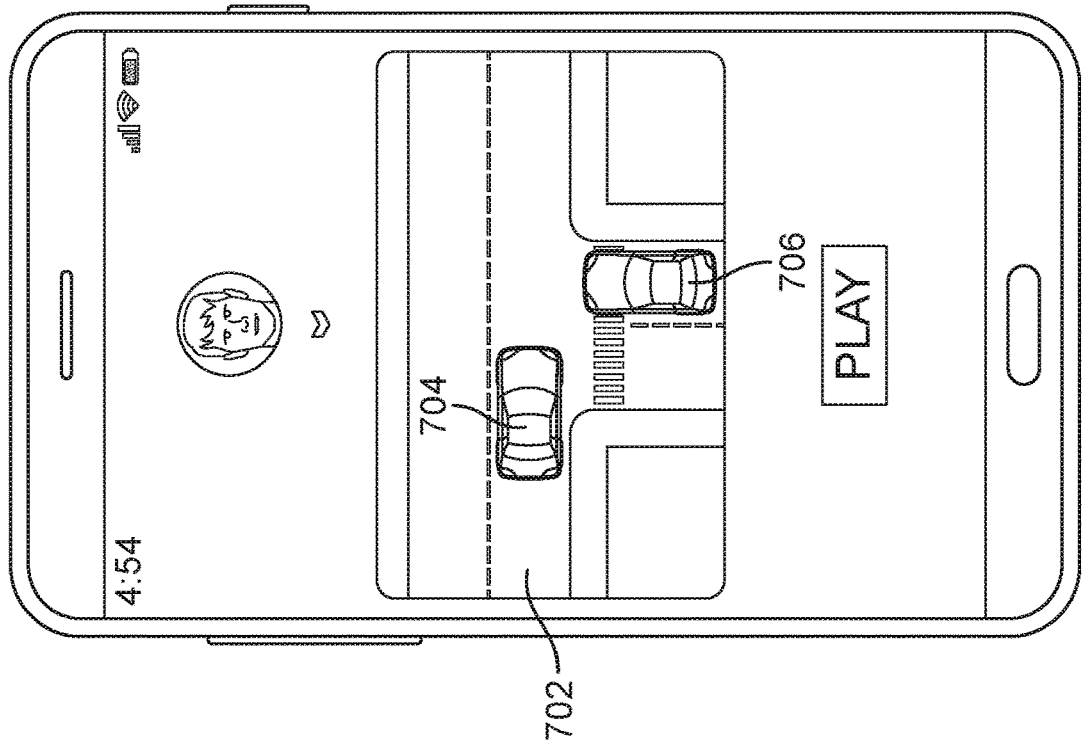

FIGS. 6-8 are schematic views of a process of presenting an animated video of an accident to a user, according to an embodiment. In this example, the video is presented on a user's mobile device (for example, a phone). In other embodiments, however, the video could be presented on a display of the vehicle, and/or on any other connected device. For purposes of illustration and clarity, the video depicts an accident as viewed from above. However, in other embodiments, the accident could be rendered from any other viewpoint, such as the driver's viewpoint, an external viewpoint or any other viewpoint. In some cases, a model is generated first, and then the model may be rendered from a particular view to create the video.

Initially, as shown in FIG. 6, the system provides a prompt 600 to the user to confirm that the vehicle has just been involved in an accident. If the user selects the YES option 602, they are presented with the animated video to review, as seen in FIGS. 7 and 8. Specifically, FIG. 7 depicts a schematic view of an initial scene from an animated video 702 corresponding to a time several seconds before the accident between vehicle 704 and vehicle 706. FIG. 8 corresponds to a scene from the video 702 occurring after vehicle 704 and vehicle 706 have collided. Although not shown in the figures, any number of intermediate scenes between the scene shown in FIG. 7 and the scene shown in FIG. 8 could be provided as part of the animated video.

As shown in FIG. 8, after the video has played, the system may provide another prompt 802 the user to confirm of the video is sufficiently accurate. In this case, the system queries the user with the following statement: "Is this a true representation?".

An animated video, along with prompting messages, can be provided to a user in a variety of formats. In some cases, the video can be provided through an application running on the user's mobile device (for example, mobile application 320 of FIG. 3). The application could be managed by the user's insurance provider, for example. Thus, following an accident, the accident reconstruction system could send the video to the mobile application over a local area network (such as Bluetooth) or a wide area network (such as a cellular network). The mobile application could then provide a push notification to alert the user to review the video. In other cases, the video could be sent through a short messaging service (SMS).

Figure 9:
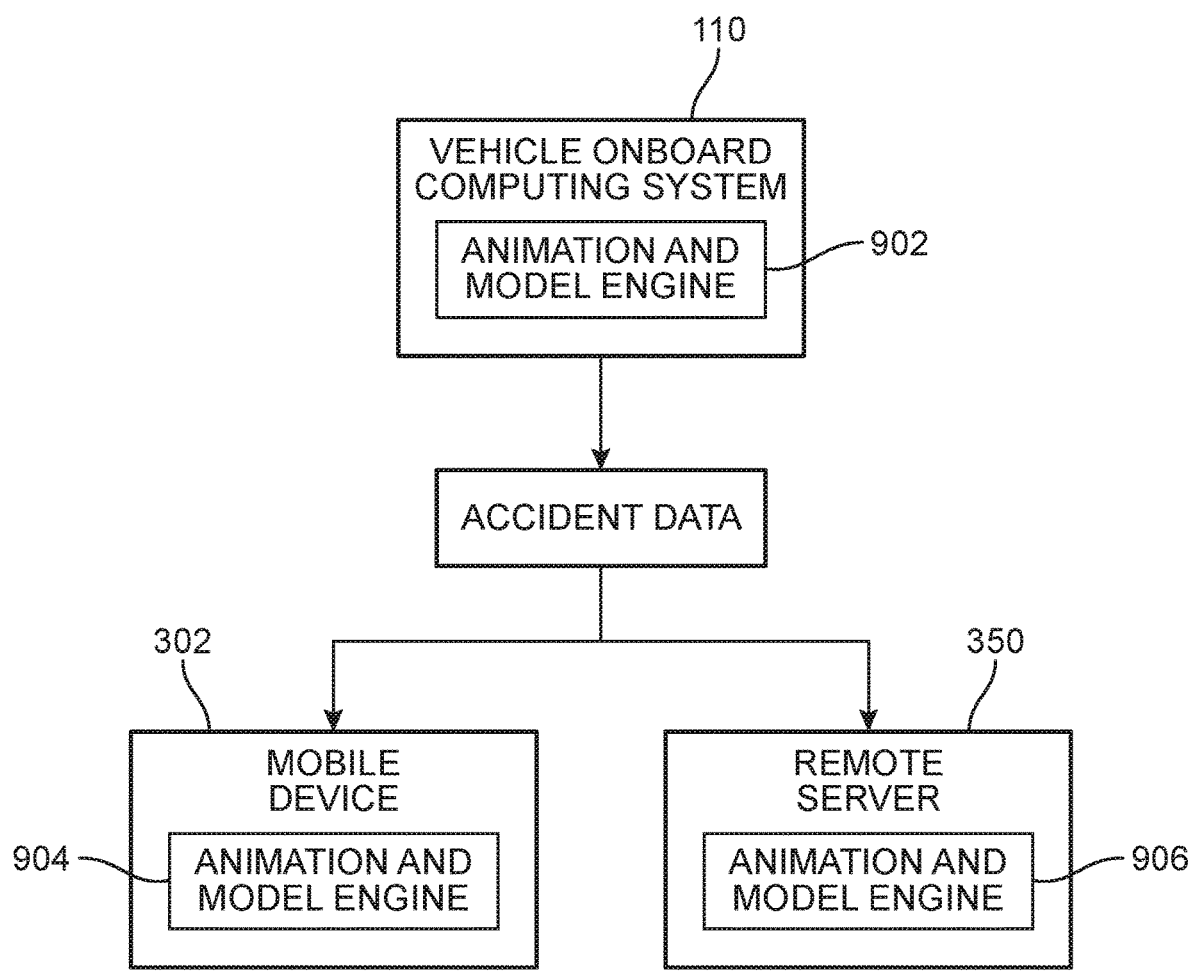
FIG. 9 is a schematic view of several systems that can include animation and model engines, according to an embodiment.

As already discussed with reference to FIG. 4, a remote server may include provisions for reconstructing an animated video from raw data. In some cases, other devices, such as a user's mobile device, could also include provisions to reconstruct animated videos from raw data. As shown schematically in FIG. 9, for example, each system could be configured with its own animation and model engine. That is, vehicle onboard computing system 110 may include a first animation and model engine 902, mobile device 302 may include a second animation and model engine 904 and remote server 350 may include a third animation and model engine 906. In some cases, these three animation and model engines may be substantially similar, so that they produce substantially identical animated videos (or 3D models) when provided with identical accident data. Although not shown in FIG. 9, it may be understood that each system could also be provided with a separate artificial intelligence engine, if needed, to enable each animation and model engine.

Figure 10:
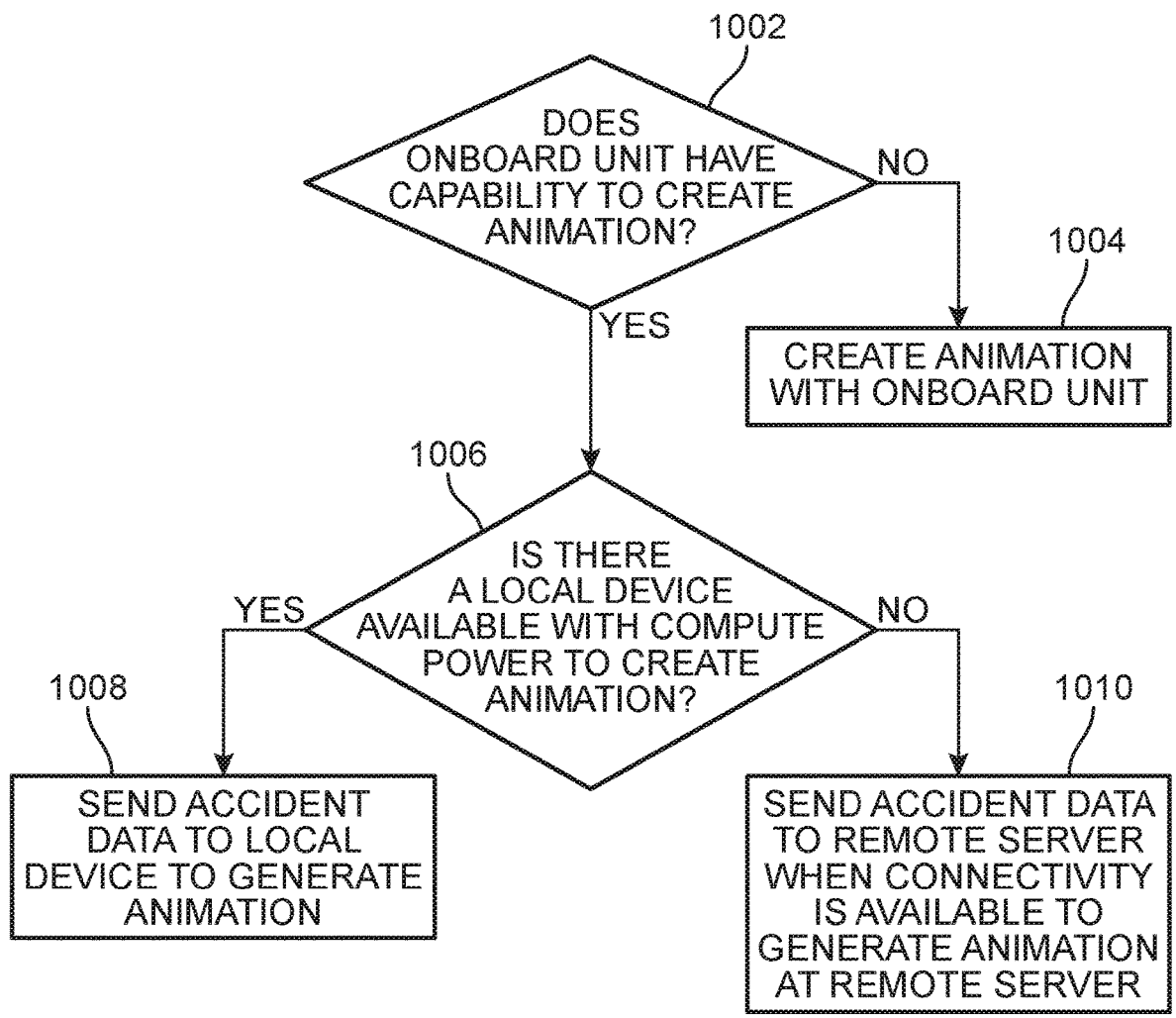
FIG. 10 is a schematic view of a process for sending accident data to different systems for processing, according to an embodiment.

This architecture allows an accident reconstruction system to gather accident data and send the data to be processed to different systems. In particular, using this architecture, the accident reconstruction system can select the optimal system for processing the raw accident data, as shown schematically in FIG. 10. Starting at step 1002, an accident reconstruction system may determine if the onboard computing system (or unit) has sufficient computing capabilities to create an animated video. If so, the onboard computing system processes the raw data to generate the video in step 1004.

In some scenarios, the onboard computing system may not have sufficient computing resources to generate a video. For example, some of the system's computing resources could fail or be impaired following an accident. In this case, the accident reconstruction system may determine if there is a local device (such as a mobile device) nearby that has sufficient computing power to create the animation. If no other devices are available, the system can send the accident data directly to the remote server as soon as connectivity is available in step 1010. In this case, the animated video is created, for the first time, at the remote server. The remote server could then send the animated video to a user's phone or other device so that the user can review the accident.

If, during step 1006, the accident reconstruction system determines there is a local device with sufficient computing resources, the system can send the accident data to the local device. For example, the system can send the accident data to the user's phone over a Bluetooth connection, Near Field Communications network connection, or WiFi connection. The mobile device, equipped with an animation and model engine of its own (see FIG. 9), can then generate the animated video of the accident for the user to view.

Some embodiments can include provisions so that the accident reconstruction system can take action after building a model and/or animation of the accident.

Figure 11:
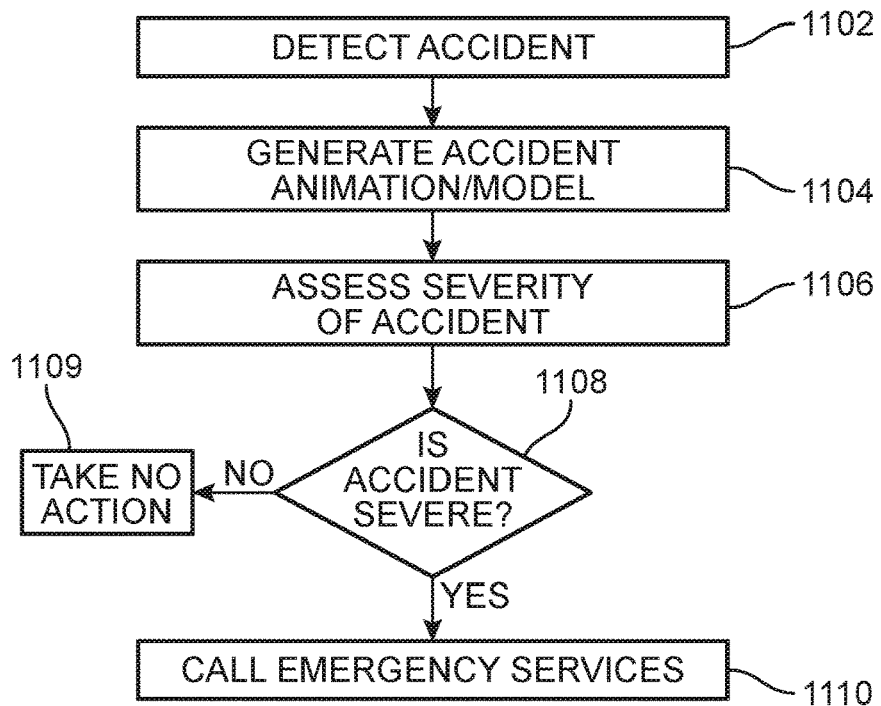
FIG. 11 is a schematic view of a process for assessing the severity of an accident based on an animated video and/or model, according to an embodiment.

FIG. 11 is a schematic view of a process for taking an action in response to generating a model of an accident. The following steps may be performed by an accident reconstruction system and/or by other systems in cooperation with the accident reconstruction system. In step 1102, an accident may be detected. Next, in step 1104, the accident reconstruction system generates an accident animation and/or model as already described. Based on the generated animation or model, the system can then assess the severity of the accident in step 1106.

In step 1108 the system determines if the accident is severe, according to some predetermined metric for evaluating the severity of an accident based on an animation and/or model. If the accident is determined to have a high severity (relative to other severity levels), the system can take further action, such as calling emergency services on behalf of the driver in step 1110. For accidents that are not determined to be severe, the system may take no further actions as in step 1109.

Figure 12:
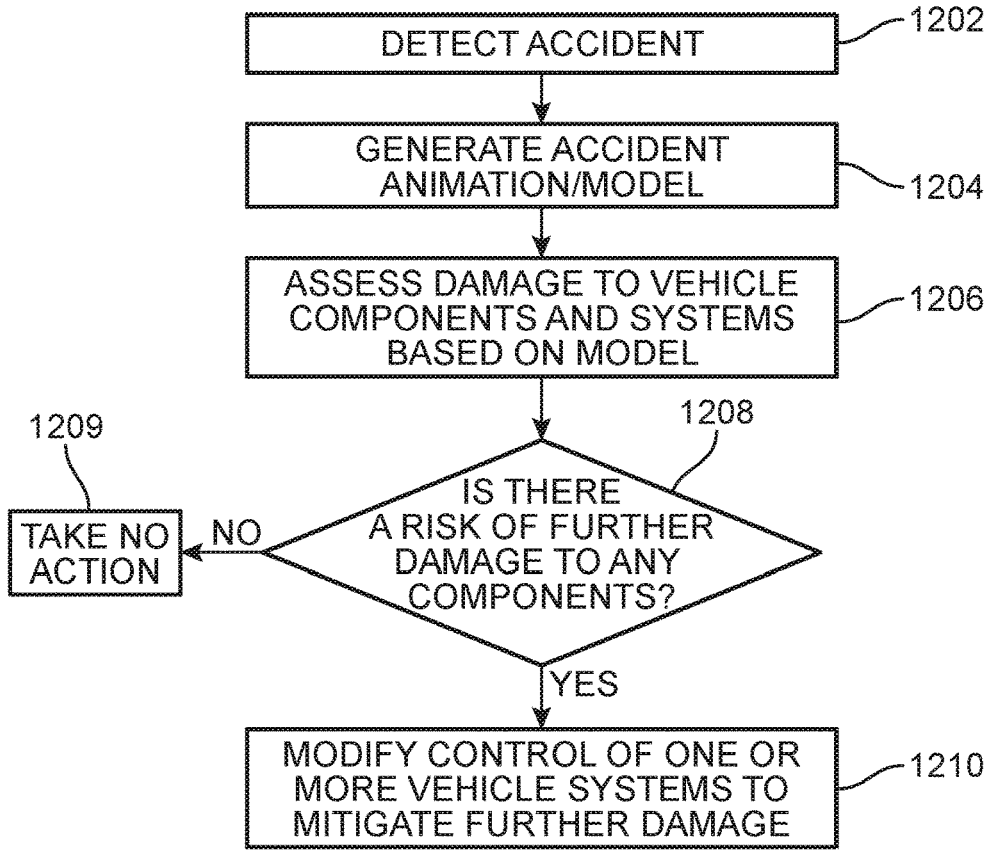
FIG. 12 is a schematic view of a process for modifying the control of a vehicle system after assessing damage to vehicle systems following an accident, according to an embodiment.

An accident reconstruction system can include provisions for mitigating further damage after an accident has occurred. FIG. 12 depicts an exemplary process for modifying the control of (or operation of) one or more vehicle systems after an accident as a way to mitigate more damage to the vehicle and/or occupants. In step 1202, the system detects an accident. Next, in step 1204, the system generates an accident animation and/or model.

In step 1206, the system assesses the damage vehicle components and systems based on the model (or animation). The system then determines if there is a risk of further damage to any components (or system) in step 1208. If there is no further risk of damage, the system may take no further actions as in step 1209. If there is a risk of further damage, the system may modify the control of one or more vehicle systems to mitigate further damage in step 1210.

As one example of damage mitigation, an accident reconstruction system could assess the state of an engine following an accident. By analyzing a 3D model of the accident and/or images from an animated video, the accident reconstruction system could determine that the engine is severely damaged and there is further risk of damage if the engine keeps running in an idle mode. In this case, the accident reconstruction system could actively control one or more engine control systems, such as the fuel injection system, to stop fuel from being injected into the cylinders.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of controlling a vehicle system in response to information from a 3D model of an accident, comprising:
    monitoring a set of vehicle sensors for a motor vehicle, the motor vehicle further including an engine;
    detecting that an accident has occurred, the accident involving the motor vehicle;
    retrieving a set of accident data from the set of vehicle sensors;
    generating a 3D model of the accident using the set of accident data;
    analyzing the 3D model of the accident and inferring damage to the engine of the motor vehicle from the analysis of the 3D model; and
    modifying the operation of the engine, in response to inferring damage from the analysis of the 3D model, to mitigate further damage to the engine.

2. The method according to claim 1, wherein the 3D model can used to build an animated video of the accident.

3. The method according to claim 1, wherein modifying the operation of the engine further comprises stopping a fuel injection system from injecting fuel into cylinders of the engine.

4. The method according to claim 1, wherein the set of vehicle sensors includes a camera.

5. The method according to claim 1, wherein the set of vehicle sensors includes a microphone.

6. The method according to claim 1, wherein the method further includes a step of assessing a severity of the accident.

7. The method according to claim 6, wherein the method includes automatically calling emergency services if the severity of the accident is determined to be sufficiently high.

8. A computing system for controlling a vehicle system in response to information from a 3D model of an accident, comprising:
    a device processor; and
    a non-transitory computer readable medium including instructions executable by the device processor to:
    monitor a set of vehicle sensors for a motor vehicle, the motor vehicle further including an engine;
    detect that an accident has occurred, the accident involving the motor vehicle;
    retrieve a set of accident data from the set of vehicle sensors;
    generate a 3D model of the accident using the set of accident data;
    analyze the 3D model of the accident and inferring damage to the engine of the motor vehicle from the analysis of the 3D model; and
    modify the operation of the engine, in response to inferring damage from the analysis of the 3D model, to mitigate further damage to the engine.

9. The system according to claim 8, wherein the 3D model can used to build an animated video of the accident.

10. The system according to claim 8, wherein the instructions are further executable by the processor to modify the operation of the engine by stopping a fuel injection system from injecting fuel into cylinders of the engine.

11. The system according to claim 8, wherein the set of vehicle sensors includes a camera.

12. The system according to claim 8, wherein the set of vehicle sensors includes a microphone.

13. The system according to claim 8, wherein the instructions are further executable by the processor to assess a severity of the accident.

14. The system according to claim 8, wherein the instructions are further executable by the processor to call emergency services if the severity of the accident is determined to be sufficiently high.

* * * * *